March 31, 1959  L. R. HAWTIN  2,879,887
METHOD OF EXTRUDING SUCCESSIVE BUT DISTINCT ARTICLES
Filed April 26, 1954  3 Sheets-Sheet 1

INVENTOR:
Laurence Reginald Hawtin,
BY Cushman, Darby & Cushman
ATTORNEYS.

March 31, 1959  L. R. HAWTIN  2,879,887
METHOD OF EXTRUDING SUCCESSIVE BUT DISTINCT ARTICLES
Filed April 26, 1954  3 Sheets-Sheet 2

INVENTOR:
Laurence Reginald Hawtin,
BY Cushman, Darby & Cushman
ATTORNEYS.

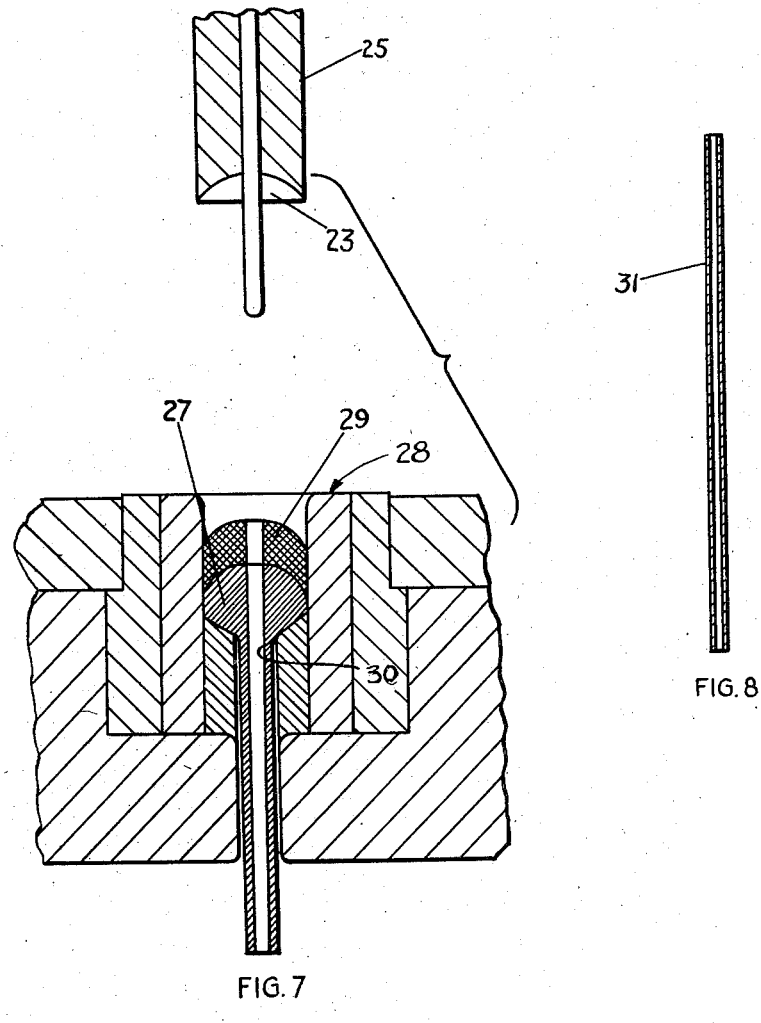

United States Patent Office 2,879,887
Patented Mar. 31, 1959

2,879,887

METHOD OF EXTRUDING SUCCESSIVE BUT DISTINCT ARTICLES

Laurence Reginald Hawtin, Yardley, Birmingham, England, assignor to Imperial Chemical Industries Limited, a corporation of Great Britain Application April 26, 1954, Serial No. 425,562

Claims priority, application Great Britain May 11, 1953

2 Claims. (Cl. 207—10)

This invention relates to methods of and apparatus for the direct extrusion of a metal. The invention will be described with reference to the production of tubular metallic products by direct extrusion but it is to be understood that the invention may equally well be applied to the production of solid metallic products.

In the production of individual metallic solid or tubular products by the direct extrusion of a metal, a billet or slug of the metal is placed within a die container adjacent to the die face and the die orifice and an extruding punch is brought up against the billet to cause the metal to flow through the die orifice away from the punch in the same direction as the movement of the punch. Due to the nature of the operation some of the billet must remain unextruded and thus at the end of the operation a butt or discard of metal is left within the die adjacent to the die orifice.

Where in the case of short extrusions this butt of metal is required to remain on the extruded portion, say as a head portion, extraction from the die container of the extruded product and its butt may readily be effected in a period of time which is small compared with that of the total extrusion cycle. But where the butt of metal is not required to remain on the extruded product it is necessary to shear the butt therefrom and then to remove the butt from the die container before inserting the next billet. Otherwise, joining together of the butt and the next billet would occur during the next extrusion cycle since their adjacent surfaces deform upon extrusion to an approximate conical shape.

Shearing of the butt from the extruded product is of a complicated nature and is lengthy, generally taking up a large proportion of the time of the total extrusion cycle, and consequently slows the rate of production of individual extruded products. Furthermore, due to the wastage of metal occurring in each extrusion cycle, it is necessary to employ a billet having a larger volume than that actually needed for each article.

It is one of the various objects of the present invention to provide an improved method for the manufacture of individual metallic products by direct extrusion.

According to this invention, a method for the production of individual metallic articles by direct extrusion comprises lubricating either a billet of metal or a die container therefor, locating the billet within the die container, partially extruding, by means of a punch, the billet through a die orifice associated with the die container, lubricating either another billet of metal or the die container, locating the other billet within the die container upon the non-extruded portion of the first-mentioned billet and thereafter completing the extrusion of the first billet and partially-extruding the second-mentioned billet by means of the punch, the billet-engaging surface of the punch having such a concave curvature that all points in that surface of a billet which is adjacent to the said surface of the punch lie in a common plane substantially perpendicular to the axis of extrusion after being extruded through the die orifice.

Also, according to the invention, apparatus for the production of individual metallic articles from metallic billets by direct extrusion comprises a punch, a die container and a die orifice through which a billet may be extruded, the billet-engaging surface of the punch having such a concave curvature that all points in that surface of a billet which is adjacent to the said surface of the punch lie in a common plane substantially perpendicular to the axis of extrusion after being extruded through the die orifice.

According to one feature of the invention, each billet is pre-formed so that its end surface which is to be adjacent to the punch is convex, being substantially complementary to that of the punch, and so that its other end surface (which, in the case of the said other billet, will be adjacent the unextruded portion of the previous billet) is concave, being substantially similar to that of the punch.

By ensuring that all the points in that surface of a billet which is adjacent the billet-engaging surface of the punch lie in a common plane substantially perpendicular to the axis of extrusion after being extruded through the die orifice, there is no question of adjacent surfaces of two billets deforming upon extrusion to a conical shape and thus there is no joining together of the two billets.

In order to determine the appropriate billet engaging surface of a punch for a given die, the procedure which will now be described with reference to Figures 1 to 6 of the accompanying drawing was followed. The die employed was conical and had an included angle of 130° but it will be appreciated that similar reasoning is correct for other shaped dies, although when other shaped dies are employed, the possible billet engaging surfaces of the punch will be different from those obtained with this specific die.

Figure 3:
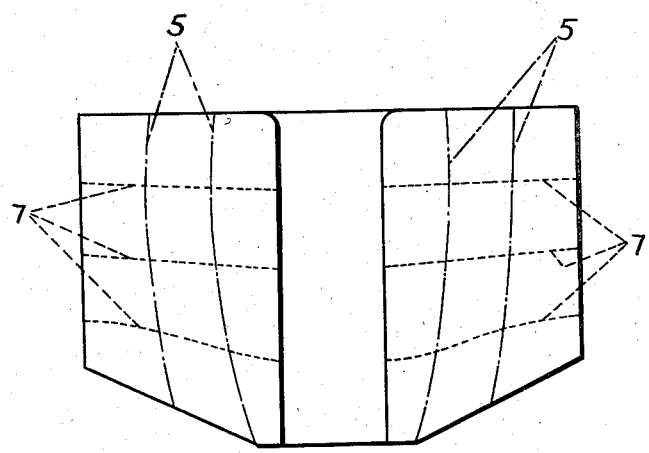
Figure 4:
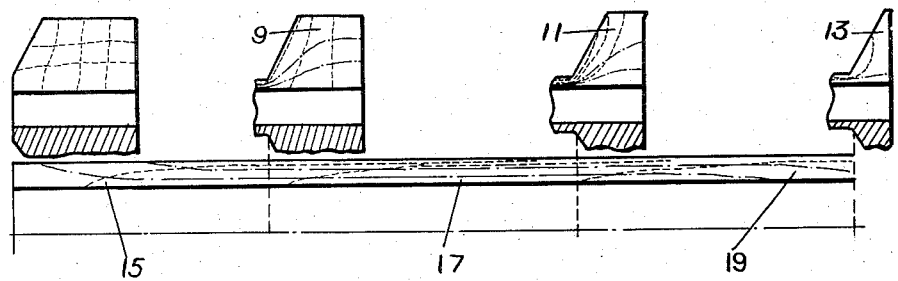
Figure 5:
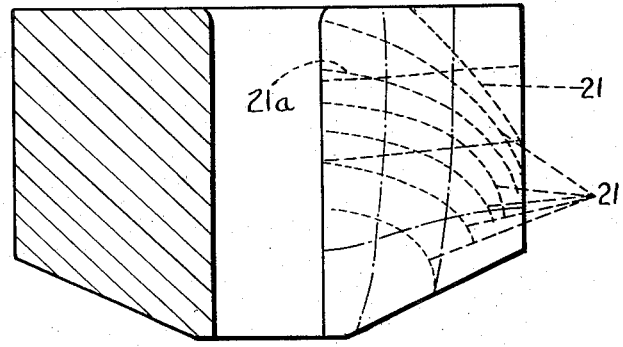
Figure 6:
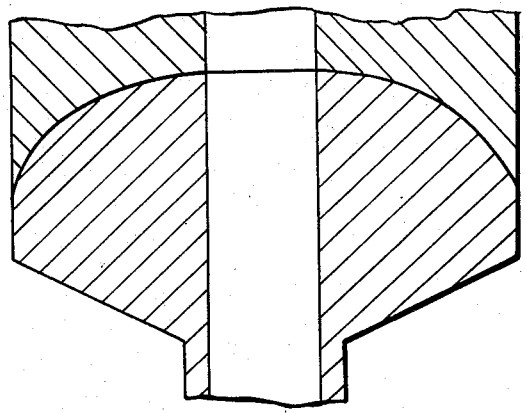

Figure 3 indicates the mutual relationship between the two milled grids when the two halves of the billet have been re-assembled and have been deformed to the point of extrusion;

Figure 4 is a diagrammatic view of the billet at four stages of the extrusion cycle;

Figure 5 shows the location of those surfaces of the billet which, after extrusion, deform to a planar surface;

Figure 6 shows, diagrammatically, a partially-extruded billet, having one of the surfaces shown in Figure 5, located in a die together with a succeeding billet having a similar surface;

Figure 7 shows diagrammatically, extrusion apparatus in accordance with one embodiment of the invention; and Figure 8 shows the product resulting from extrusion of a billet in the apparatus of Figure 7.

Figure 1:
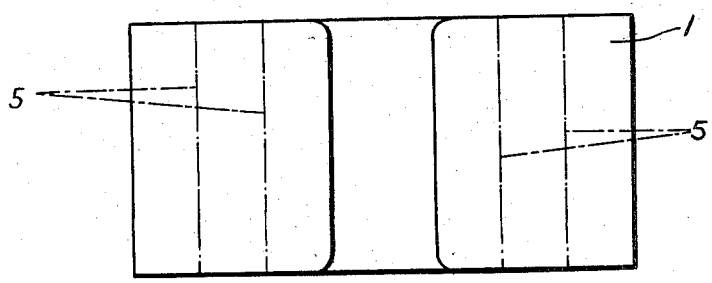
Figure 1 is an elevational view of one half of a billet for use with the conical die, which billet has been split along a diametral plane and which has had a grid milled on its diametral face.
Figure 2:
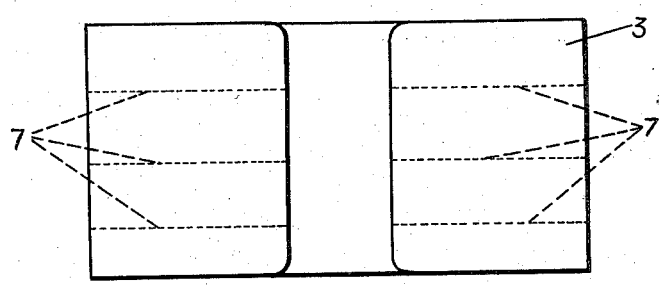
Figure 2 is an elevational view of the other half of the billet which has had a different grid milled on its diametral face.

In order to determine the appropriate billet-engaging surface of a punch, for use with a die container of a particular size for producing the desired tubular articles having a die face with an included angle of 130°, a short cylindrical pierced billet (see Figures 1 and 2) is cut across a diametral plane to provide two substantially-equal halves 1, 3. The diametral surfaces of these two halves are made smooth by machining. Reference grooves which are 0.015 inch wide and 0.015 inch deep are then cut on the diametral faces of the two halves 1, 3, the grooves 5 on the half 1 being longitudinal (see Figure 1) and the grooves 7 on the half 3 being transverse (see Figure 2). The grooves are subsequently filled with a mixture of red lead oxide and boiled linseed oil which is allowed to harden.

Several such billets are assembled together and each is extruded to a different extent by controlling the movement of the punch. Figures 3 and 4 show a billet deformed to the point of extrusion and Figure 4 shows, additionally, three billets 9, 11 and 13 each being extruded to a different extent and producing extruded parts or tubes 15, 17 (which includes the part 15), and 19 (which includes the parts 15 and 17). The tubes resulting from the extrusion of the several billets are separated longitudinally and then radiographed to determine the flow of the displaced reference grooves as a result of extrusion. The displaced reference grooves are shown diagrammatically in Figure 4, and the positions of the points of intersection of the displaced grooves in the extruded tubes (and also the displaced points of intersection of the grooves with the free surface of the billet) are measured by means of a travelling microscope and a projection enlarger, and the longitudinal positions recorded on a diagram similar to that of Figure 3. Contours 21, see Figure 5, are then derived from these measurements.

It will be appreciated that all points in each one of the contours 21 will, after extrusion, lie in a common plane substantially perpendicular to the axis of extrusion.

From these contours it is possible to prepare a set of tools suitable for carrying out one embodiment of the invention, the work-engaging surface of each tool corresponding with one of these contours. Since it is not desirable in the production of metallic articles by direct extrusion for the punch to come into contact with the die face, use will only be made of those contours, such as 21a, which terminate on the container wall and no use will be made of those contours which terminate on the die face.

Referring to Figure 7 of the drawings, the surface 23 of the punch 25 is shaped so as to conform to one of the contours 21 e.g. 21a. The billet 27 before extrusion had coined end surfaces conforming to such contour and after lubrication of the external and internal surfaces, but not of the end surfaces, the billet was placed in a suitable billet die container 28 and partially extruded through the die orifice 30 without the application of external heat. Another pre-coined lubricated billet 29 is then placed in the die container 28 on top of the first billet 27 and the first billet 27 is then completely extruded and the second is partially extruded. Further pre-coined lubricated billets are employed in succession and a series of discrete tubes, such as 31 (Figure 8) are produced, since there is no overlapping length of one billet within the end portion of the former billet.

It is not necessary in certain applications such as in the production of finned tubes for the billets and the billet engaging surface of the punch to have the precise shape shown in the drawings. It has been found, in practice, that shapes approximating thereto allow discrete articles to be produced upon extrusion.

It will be readily apparent that there is a considerable saving in time during the extrusion of a number of articles since there is no need to remove unextruded material from the die.

The method described above with particular reference to Figure 7 of the accompanying drawings can be regarded as being a cold extrusion method since no heat is supplied to the billets at any time from an external source, the only heat arising being developed during the extrusion operation by reason of its nature.

As far as we can be certain, there seems to be no reason which would preclude the utilization of the invention in a hot extrusion process, that is to say one in which heat is supplied from an external source, provided a suitable lubricant were employed, but we are not aware at this time of such a suitable lubricant.

We claim:

1. A method for the production of individual metallic articles by direct extrusion comprising lubricating one of the opposed surfaces of a billet and a billet container therefor, an end surface of the billet adjacent an extrusion punch having been preformed to a selected convex shape corresponding to a previously determined metal flow contour in the billet in which all points will lie substantially in a plane perpendicular to the axis of extrusion after being extruded through a die orifice associated with the billet container, partially extruding the billet through the die orifice by means of the punch until said end surface of the billet has reached, without deformation, a position in the billet container corresponding to the position of said metal flow contour, withdrawing the punch, lubricating one of the opposed surfaces of another billet and the billet container, the latter billet having a front end surface preformed to a shape substantially complementary to and a back end surface substantially similar to said end surface of the first named billet, locating the second named billet within the billet container with its front end surface in contact with the non-extruded portion of the first named billet, and thereafter completing the extrusion of the first billet and partially extruding the second-mentioned billet by means of the punch until the back end surface of the second billet has reached the said position in the billet container corresponding to the position of the said metal flow contour.

2. A method according to claim 1 wherein each billet is preformed so that its end surface which is to be adjacent the punch is convex, being substantially complementary to that of the punch and so that its other end surface is concave, being substantially similar to that of the punch.

References Cited in the file of this patent

UNITED STATES PATENTS

| | | |
|---|---|---|
| 494,156 | Newell | Mar. 28, 1893 |
| 1,395,217 | Begot | Oct. 25, 1921 |
| 1,720,722 | Dean | July 16, 1929 |
| 1,771,620 | Ehrmann | July 29, 1930 |
| 2,023,498 | Winston | Dec. 10, 1935 |
| 2,335,590 | Gersman | Nov. 30, 1943 |
| 2,466,642 | Larsen | Apr. 5, 1949 |
| 2,639,809 | Perry et al. | May 26, 1953 |
| 2,750,034 | Gersman | June 12, 1956 |

OTHER REFERENCES

"Webster's New International Dictionary of the English Language," second edition, unabridged, S. and C. Merriam Company, Publishers, Springfield, Mass., c1934.